United States Patent [19]
Johnston et al.

[11] Patent Number: 5,566,988
[45] Date of Patent: Oct. 22, 1996

[54] HEAT SHRINKABLE HOSE CLAMP WITH INDICATOR

[75] Inventors: Jonathan A. Johnston, Northglenn; Michael V. Peake, Evergreen; Keith M. Krause, Westminster, all of Colo.

[73] Assignee: The Gates Rubber Company, Denver, Colo.

[21] Appl. No.: 57,242

[22] Filed: Apr. 30, 1993

[51] Int. Cl.⁶ ................................................ F16L 35/00
[52] U.S. Cl. ................................................ 285/93; 285/242
[58] Field of Search ........................ 285/21, 242, 93, 285/381; 24/90 HA, 447, 448; 174/DIG. 8

[56] References Cited

U.S. PATENT DOCUMENTS

| | | | |
|---|---|---|---|
| 3,198,556 | 8/1965 | Krase et al. ............................ | 285/93 |
| 4,686,071 | 8/1987 | Rosenzweig et al. ............... | 285/93 X |
| 4,727,242 | 2/1988 | Barfield ............................... | 285/21 X |
| 4,732,412 | 3/1988 | Linden et al. ...................... | 285/93 X |
| 4,869,533 | 9/1989 | Lehmann ........................... | 285/93 X |
| 5,116,082 | 5/1992 | Handa et al. ...................... | 285/93 X |
| 5,169,176 | 12/1992 | Brossard ........................... | 285/381 X |
| 5,340,167 | 8/1994 | Morse ............................... | 285/381 X |

FOREIGN PATENT DOCUMENTS 173174   3/1989   European Pat. Off. ............... 285/93

Primary Examiner—Dave W. Arola
Attorney, Agent, or Firm—Steven G. Austin; C. H. Castleman; H. W. Oberg

[57] ABSTRACT

The invention is an improved hose clamp of the type formed of a band of heat shrinkable polymer having a diameter reducing released temperature, an inside band surface and an outside band surface. It is improved by the inclusion of a shrinkage indicator.

10 Claims, 2 Drawing Sheets

HEAT SHRINKABLE HOSE CLAMP WITH INDICATOR

BACKGROUND OF THE INVENTION

1. Field of the Invention

This invention relates generally to the clamping of elastomeric hose and tubing to fixtures and hose coupling devices and to the use of bands of heat shrinkable polymer to provide a constrictive force about elastomeric hose and tubing. More particularly, this invention relates to an improved heat shrinkable hose clamp where a device is incorporated to get positive indication of when the heat shrinkable clamp is adequately shrunk to effect its intended purpose. Specifically, the invention relates to a shrinkage indicator, that forms part of the heat shrinkable hose clamp, that indicates proper installation including adequate heat application to the clamp to effect adequate clamping force.

2. Description of the Prior Art

Elastomeric hose and tubing, hereinafter generically referred to as hose, are commonly used to convey various fluids, where those fluids are under a variety of pressures and temperatures, as part of a fluid transport system. For these systems to be operable, the connections between hoses and the items with which the hoses fluidly communicate must be fluid tight and able to resist separation that would otherwise occur because of the influence from the fluid pressure, or blow-off, as well as surrounding environment, or pull-off. Commonly, these connections are made by placing the open end of the hose over a stem or coupling insert. The hose and the associated stem or insert are ordinarily sized and shaped to allow the opening of the hose to slip over the stem or insert and to seat with a snug fit. For systems operating at certain pressures and in certain environments, nothing more is required. More typically, however, a hose clamp is installed near the open end of the hose, urging the hose more tightly upon the stem or insert to resist leakage, blow-off, and pull-off.

Hose clamps have been produced in various sizes, shapes, and materials. One style of hose clamp is formed of a band of heat shrinkable polymer. Hose clamps of this type are more fully discussed in copending application, Ser. No. 07/841,951, and is incorporated herein by reference. Such a material is mechanically expanded, stretched or oriented and formed into a band. Once the temperature of the material forming the band is sufficiently elevated, a portion of the energy, that is put into the material through the orientation process, will be released, as manifest by the band tending to shrink to its original or pre-oriented dimensions. The temperature at which this shrinkage begins is commonly referred to as the release temperature, as that is the temperature at which the stored energy of orientation is released. In the case of the material formed into a ring or band, this temperature can logically be referred to as the diameter reducing release temperature.

In use; the heat shrinkable hose clamp is placed about an end of a hose; the hose is placed upon some type of hose insert or stem, such as would be encountered on an automotive radiator, hose-to-hose connector, or other device or mechanism to which a fluidic connection is desired; and heat is applied to the clamp until shrinkage occurs and appears or is guessed to be sufficient.

On any hose clamp installation, the one doing the installation ordinarily relies on past performance of similar or like clamps to be satisfied that the installation, just effected, will produce the desired result (i.e. maintain the hose connection against the expected environment and maintain a fluid-tight seal). There is rarely, if any, feedback to the installer that the particular installation at hand will prove to be satisfactory. Feedback, of this type, would have the obvious advantage of improving quality in hose connections. This is particularly true where heat shrinkable hose clamps are involved, as heat shrinkable hose clamps are not only susceptible to the problems that would interfere with any hose clamp installation being satisfactory (e.g. mis-izing of a clamp, misalignment of the clamp, or the clamp itself being faulty), it also has the consideration of proper application of heat. If the heat applied is insufficient or poorly distributed about the heat shrinkable clamp, then conceivably, the clamp will not produce adequate clamping force to produce the desired result.

Accordingly, there remains the need to produce positive indication that the heat shrinkable hose clamp, just installed, is producing, and therefore is likely to continue to produce, adequate clamping force to achieve the desired result.

SUMMARY OF THE INVENTION

Accordingly, the present invention has as an object the provision of an improved heat shrinkable hose clamp that incorporates an indicator mechanism that provides feedback as to the adequacy of the installation of and clamping force being exhibited by the clamp, at the time of installation. To achieve the foregoing and other objects in an accordance with the purpose of the present invention, as embodied and broadly described herein, a heat shrinkable hose clamp and indicator is disclosed herein. The invention is an improved hose clamp of the type formed of a band of heat shrinkable polymer having a diameter reducing release temperature, an inside band surface and an outside band surface. It is improved by the inclusion of a shrinkage indicator.

BRIEF DESCRIPTION OF THE DRAWINGS

The accompanying drawings, which are incorporated in and form part of the specification in which like numerals designate like parts, illustrate preferred embodiments of the present invention and together with the description, serve to explain the principles of the invention. In the drawings.

DETAILED DESCRIPTION OF THE PREFERRED EMBODIMENTS

Figure 1:
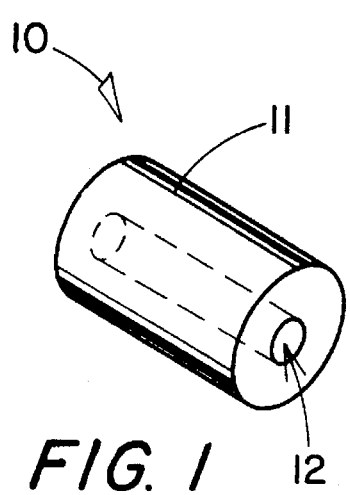
FIG. 1 is a perspective view of a preferred embodiment of the present invention prior to orientation of the heat shrinkable polymer material.

Referring to FIG. 1, there is shown a preferred embodiment of the present invention in the form of a heat shrinkable polymer hose clamp 10 in its non-oriented, pre-expanded state. The clamp 10 is formed by first extruding a tube 11 of the clamp material with a bore 12, and cut to length, as shown. The tube is then mechanically expanded, taking on the end appearance depicted in FIG. 2 by solid lines. This mechanical expansion is performing polymer orientation, which is the process of mechanically deforming the polymer material so as to put energy into the molecular structure of the material by generating stress within the polymer structure, that can later be released. The stress release is manifest by the polymer material reshaping toward the shape it occupied prior to polymer orientation.

At this point, the tube 11 of hose clamp 10 has breaches 14 created in tube 11. These breaches 14 can take the form of small holes (0.0125"–0.0500" diameter) that are drilled or punched circumferentially around the center of tube 11. It is also contemplated that when viewed from outer surface 16 these breaches can be in the forms of linear slits or punches or that appear as multiple intersecting slits forming such figures as an "X", an asterisk, or so forth. The breach 14 formed as a slit is defined herein as linear. Whereas those shapes that take the form of multiple intersecting slits are defined herein as multi-cross linear.

Figure 2:
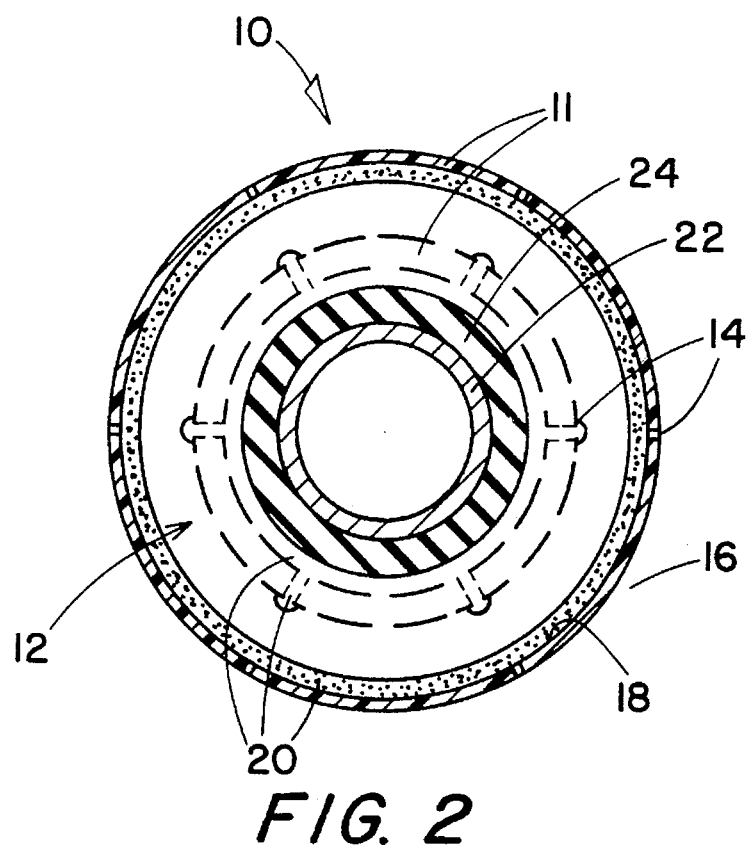
FIG. 2 is an end view of the preferred embodiment illustrating the oriented polymer being heat shrunk into position taken on the line 2—2 of FIG. 3.

The expanded tube 11, with breaches 14, then has viscous material 20 applied along inner surface 18 of tube 11. While the preferred embodiment depicted in FIG. 2 depicts viscous material 20 being uniformly distributed along inner surface 18, it is also contemplated that viscous material 20 will be applied in small dollops directly adjacent to breaches 14. Alternatively, it is anticipated that the viscous material 20 be first applied to the hose. Only after the clamp 10 is placed upon the hose does the viscous material 20 come into contact with inner surface 18.

The viscous material 20 is preferably thermoplastic material typically, polyethylene, polyethylene blends, or ethylene vinyl acetate blends or alternatively of a thermosetting material. Most preferably this material is formulated to have a melt point that roughly coincides with the diameter reducing release temperature of the material of tube 11. This provides the optimum situation where the viscous material 20 will not begin to flow through breaches 14, and thus becoming visible from the outside surface, until both of two desired conditions are met. Those conditions being adequate clamping force being produced by the clamp and enough heat has penetrated the tube 11 for the inside surface to be at diameter reducing release temperature and thus causing the viscous material 20 to melt. It is desirable that the inside surface 18 reach diameter reducing release temperature to insure uniform shrinkage about tube 11.

Figure 3:
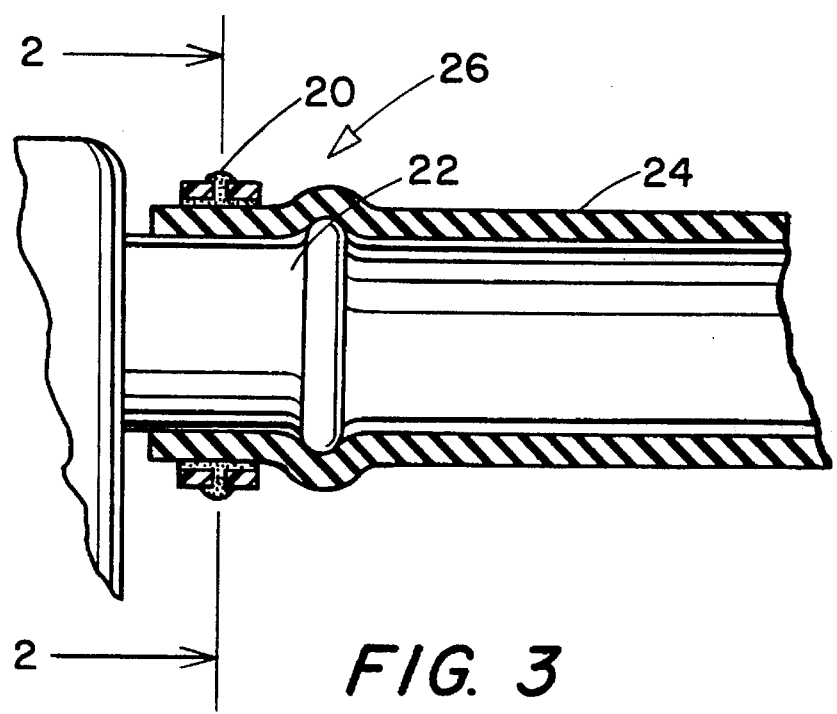
FIG. 3 is a cut away view depicting a preferred embodiment applied to the hose upon a stem.
Figure 4:
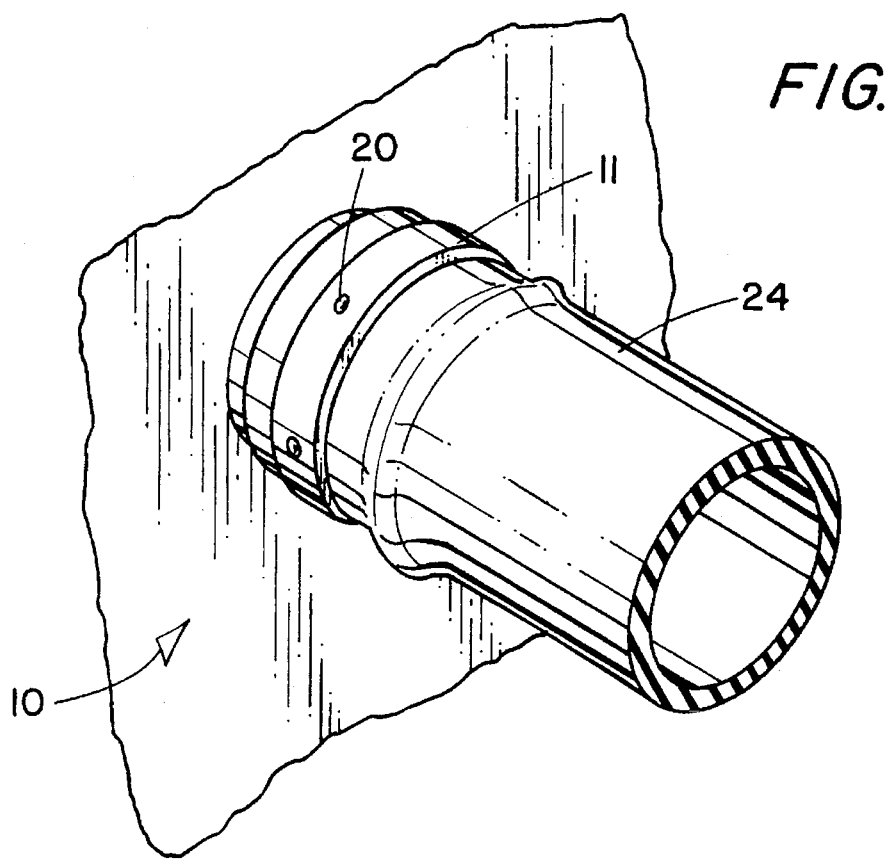
FIG. 4 is a perspective view depicting a preferred embodiment applied to the hose upon a stem.
Figure 5:
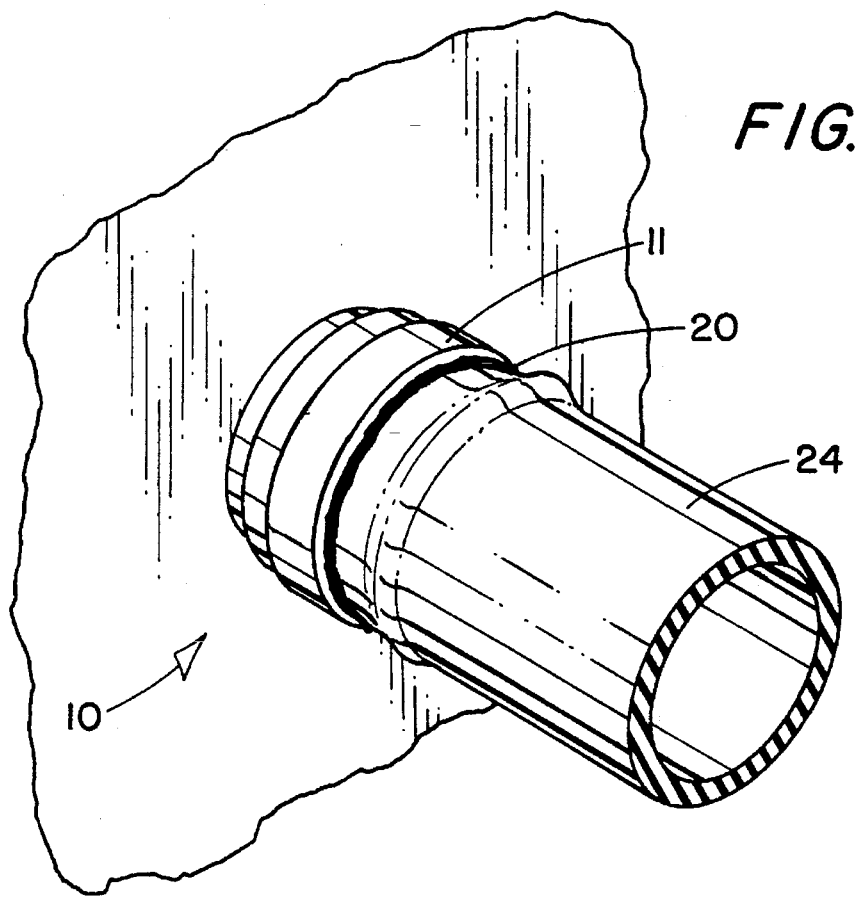
FIG. 5 is a perspective view depicting a preferred embodiment applied to the hose upon a stem.

The hose clamp 10 is now prepared for placement about the connection end of elastomeric hose for clamping the hose to a stem or other hose insert 22, as depicted in FIGS. 3 and 4. The stem or other insert 22 can be associated with any fluid transport system. The application of the clamp 10 generally involves placing the clamp 10 loosely about the hose 24, at the connection end 26, placing the connection end 26 about the stem or insert 22, then heating the clamp 10 to a temperature where shrinkage will occur, referred to as the diameter reducing release temperature. The temperature is maintained at or about the release temperature, at least, until the clamp 10 shrinks down to fit very snugly about the connection end 26, as depicted in FIGS. 3, 4, and 5 and as dotted lines in FIG. 2. It can be seen at this point that, if the temperature of tube 11 uniformly reaches diameter reducing release temperature, the constrictive or clamping force applied by the clamp 10 is substantially uniform.

The heating of clamp 10 can be by various conductive, convective, or radiation techniques. Those being the placement of a hot object directly upon the outer surface 16 of clamp 10, flowing hot fluid upon clamp 10, or shining a heat lamp upon clamp 10.

In this preferred embodiment, upon heating the clamp 10 to diameter reducing release temperature it will shrink down upon hose 24. If the viscosity and melt point of the viscous material 20 are at the appropriate levels, then the viscous material 20 will ooze out from breaches 14, becoming visible when the outer surface 16 is being viewed. This visibility from the outer surface, however, will only occur if clamp 10 produces proper clamping force and has been properly heated. Proper clamping force being that force that falls within design parameters, for the clamp 10. Proper heating occurring only after the inner surface 18 has reached the diameter reducing release temperature which roughly coincides with the point the viscous material 20 flows under a given pressure. This indicator will allow detection of several different undesirable anomalies. Those being certain conditions of misplacement or misalignment of the clamp 10, a defective clamp 10 that cannot produce designed clamping force, or a clamp that has not received adequate heating.

Another preferred embodiment is depicted in FIG. 5. Here the tube 11 of clamp 10 is completely devoid of breaches 14. In this embodiment, as the viscous material 20 begins to and flow, instead of becoming visible through breaches 14 along outer surface 16, the viscous material becomes visible only as it flows out from under inner surface 18 along the longitudinal edges of tube 11. In this embodiment, application of the clamp 10 and the general process of indicating that the clamp is properly installed and heated remains essentially unchanged. However, the location upon the clamp where indication is given, that the clamp has been properly installed, changes.

It is also contemplated that the viscous material 20 can also contain dyes and pigments of various colors to enhance the visibility of the viscous material 20. It is also contemplated that the viscous material 20 can be a paste or other material with a melt point that becomes irrelevant. This is to say that the material has a characteristic that it manifests no significant flow along inner surface 18 at a time just prior to installation of clamp 10, but will flow as a result of clamping forces created by the shrinkage of the clamp 10. While this will not indicate that uniform heating of the tube 11 has necessarily occurred, its flow will still be a function of clamping force transmitted from clamp 10 to hose 24. It is expected, that for certain applications, this aspect of indication will be sufficient. The paste could be similar to something such as toothpaste. This alternate material could be used with either preferred embodiment depicted in FIGS. 4 or 5.

To achieve optimum indication result and pleasing esthetics, the size, shape and number of the breaches 14, the viscosity of the viscous material 20, the melt point of viscous material 20, the color and consistency of viscous material 20 may all require adjustment. It should be recognized that all these factors affect each other. If a breach 14 design is chosen to be a large hole, at the same time the viscosity of viscous material 20 is chosen to be quite low, then the indication may prove to be very reliable but very drippy and messy and accordingly, very unpleasant aesthetically. Only upon addressing specific needs, for a specific application, can a designer select from among all available options to best fulfill those needs. Likewise, selection of the material to form tube 11 is application specific.

The ultimate result of the proper selection of viscous material 20, and number, size and shape of breach 14, is a hose clamp that provides feedback to the installer, indicating that the clamp has been properly installed, adequately heated, and produces a design clamping force. These benefits have heretofore been unavailable in heat shrinkable hose clamps.

The foregoing description and illustrative embodiments of the present invention have been shown on the drawings and described in detail in varying modifications and alternative embodiments. It should be understood, however, that the foregoing description of the invention is exemplary only, and that the scope of the invention is to be limited only to the claims as interpreted in view of the prior art. Moreover, the invention illustratively disclosed herein suitably may be practiced in the absence of any element which is not specifically disclosed herein.

What is claimed is:

1. An improved hose clamp for clamping about an elastomeric hose of the type formed of a band of heat shrinkable polymer having a diameter reducing release temperature, an inside band surface and an outside band surface, wherein the improvement comprises, said clamp including means for indicating shrinkage thereof.

2. An improved hose clamp for clamping about an elastomeric hose of the type formed of a band of heat shrinkable polymer having a diameter reducing release temperature, an inside band surface and an outside band surface, wherein the improvement comprises, said clamp including means for indicating shrinkage thereof, including a viscous material in contact with said inside band surface adapted to begin a substantial flow along said band surface upon said clamp becoming sufficiently clamped about an elastomeric hose.

3. The improvement of claim 2 wherein said shrinkage indicator means further comprises said band being formed with at least one breach adapted to allow said viscous material to contact said outside band surface after said beginning of said substantial flow.

4. The improvement of claim 3 wherein said breach is substantially round when viewed from said outside band surface.

5. The improvement of claim 3 wherein said breach is substantially linear when viewed from said outside band surface.

6. The improvement of claim 3 wherein said breach is multi-cross linear when viewed from said outside band surface.

7. The improvement of claim 2 wherein said viscous material is a viscous paste.

8. The improvement of claim 2 wherein said viscous material is a viscous thermoset material.

9. The improvement of claim 2 wherein said viscous material is a thermoplastic.

10. A fluid connection system comprising:

a stem;

an elastomeric hose sealingly engaged upon said stem;

a band of heat shrinkable polymer having a diameter reducing release temperature, an inside band surface and an outside band surface, placed about said stem and said hose; and means for indicating shrinkage thereof including a viscous material, interposed between said inside band surface and said elastomeric hose, adapted to begin a substantial flow along said inside band surface upon said band becoming sufficiently clamped about said hose.

* * * * *